(12) United States Patent
Yatsu (10) Patent No.: US 6,417,983 B1
(45) Date of Patent: Jul. 9, 2002

(54) SYSTEM FOR HEAD POSITIONING CONTROL IN A DISK DRIVE

(75) Inventor: Masahide Yatsu, Akishima (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/389,367

(22) Filed: Sep. 3, 1999

(30) Foreign Application Priority Data

Dec. 24, 1998 (JP) .......................................... 10-367209

(51) Int. Cl.$^7$ .............................................. G11B 5/596
(52) U.S. Cl. ...................................... 360/77.04; 360/75
(58) Field of Search ........................... 360/77.04, 78.09, 360/75; 369/44.11, 44.13, 44.32

(56) References Cited

U.S. PATENT DOCUMENTS

| | | | |
|---|---|---|---|
| 4,628,379 A | * 12/1986 | Andrews et al. | 360/77.04 X |
| 5,539,714 A | 7/1996 | Andrews, Jr. et al. | 369/44.26 |
| 5,550,685 A | * 8/1996 | Drouin | 360/77.04 X |
| 5,930,067 A | 7/1999 | Andrews et al. | 360/77.04 |
| 5,959,952 A | 9/1999 | Wakuda | 369/44.32 |
| 5,995,318 A | * 11/1999 | Hasegawa et al. | 360/78.14 |
| 6,166,875 A | * 12/2000 | Ueno et al. | 360/77.04 |

FOREIGN PATENT DOCUMENTS

| | | |
|---|---|---|
| JP | 4-170775 | 6/1992 |
| JP | 63-263674 | 10/1998 |

* cited by examiner

*Primary Examiner*—David Hudspeth
*Assistant Examiner*—K. Wong
(74) *Attorney, Agent, or Firm*—Pillsbury Winthrop LLP (57) ABSTRACT

A system for positioning a head in a target position on a disk in a disk drive is realized by combining a feedback control system and a feed forward control system that is a learning system. The feed forward control system observes the position error computationally determined by the feedback control system and detects a track eccentric factor synchronized with the revolution of the disk from the outcome of the observation. The feed forward control system generates an oscillation with a predetermined frequency (sine wave) different from the period of revolution of the disk and adds it to the position error from the feedback control system. The feed forward control system then computationally determines a control value (Uf) for removing the synchronous factor (track eccentric factor) correlated among a plurality of tracks from the position error.

14 Claims, 5 Drawing Sheets

SYSTEM FOR HEAD POSITIONING CONTROL IN A DISK DRIVE

BACKGROUND OF THE INVENTION

This invention relates to a head positioning control system adapted to be used in a disk drive such as a hard disk drive. More particularly, the present invention relates to a head positioning control system having a compensation feature for suppressing position errors of the head caused by synchronous components that are synchronized with the revolution of a head.

Conventionally, a hard disk drive (HDD) is adapted to make a magnetic head (hereinafter referred to simply as head) write data on and read data from a disk that is a data storage medium. An HDD is typically designed to operate with one or more than one disks at a time and have a pair of heads arranged respectively vis-a-vis the front and rear surfaces of each disk (the respective data carrying surfaces of the disk). In short, an HDD has a pair of heads for each disk. For the purpose of simplification, an HDD having a head for a single disk will be envisaged in the following description.

A disk has a number of concentric tracks (cylinders) on each of its opposite surfaces as data recording area. Each track is divided into a plurality of data sectors (area for recording user data) and provided with servo areas carrying servo data recorded thereon and arranged at predetermined intervals. Each data sector is arranged between two servo areas.

Each set of servo data include a track address (cylinder code) for identifying the track where it is located and servo burst data (position signal pattern). The area from a servo area to the may be referred to as servo sector. Then, each track is divided into a plurality of servo sectors (the number of which corresponds to that of servo areas). Each servo sector comprises one or more than one data sectors led by a servo area.

The HDD is provided with a head positioning control system, which is so configured that, once the track to be accessed (target position) is specified, it controls and drives the head to move to the target position (seek control) in such a way that the head is positioned within the track (track following control). The head positioning control system carries out its track following control operation by means of a feedback control system 1 as conceptually illustrated in FIG. 6 of the accompanying drawing.

Figure 6:
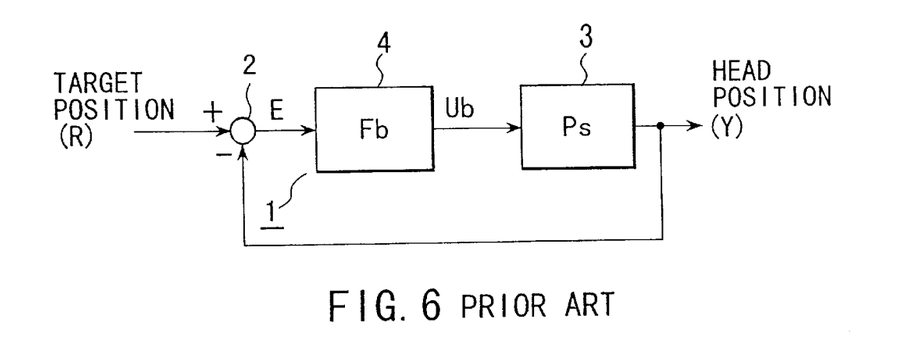
FIG. 6 is a schematic block diagram of a feedback control system applicable to a known head positioning control system.

The feedback control system 1 basically comprises a position error detecting element (subtracting element) 2, a control element (controller) 4 and a plant (object of control) 3. The subtracting element 2 computationally determines the position error (E) of the actual head position (Y) from the target position (R). The plant 3 is an actuator mounted with a head in a broad sense of the word and a voice coil motor (VCM) for driving the actuator in a narrow sense of the word. The actuator is driven by the VCM to move the head radially on a disk and place the head on the target position.

The controller 4 receives the head position (Y), the target position (R) and the position error (E) as inputs and computationally determines a control value (Ub) to be used for dissolving the position error (E). The control value (Ub) refers to a manipulative control value required for manipulating the drive current of the VCM, which is the plant 3. The subtracting element 2 and the controller 4 specifically refer to a micro controller (CPU) or a main control unit to be used for an HDD. The transfer functions of the controller 4 and the plant 3 are denoted respectively by "Fb" and "Ps".

The controller 4 computationally determines a control value (Ub) so as to carry out an operation of stabilizing compensation for a closed loop system and compensate the deviation of the servo data. The term "stabilizing compensation" refers to an operation of stabilizing a loop by compensating the phase delay of a system and hence is also called as "phase lead compensation". To be more accurate, when the phase delay goes below "−180 degrees" with a gain crossover frequency, the control loop becomes unstable. Thus, a digital filter is arranged within the control loop to make compensation so as to lead the phase with the gain crossover frequency. On the other hand, the term "deviation compensation" refers an operation of reducing the relative error between the servo data recorded on a track of a disk and the head to improve the accuracy of positioning the head. Since the actuator mounted with the head is connected to an FPC (flexible printed circuit board), it is subjected to the distortions of the FPC and external force. The FPC is provided to transmit signals between the head and the head amplifier and conduct electricity to the VCM. The servo data stored on the disk are subject to positional shifts due to oscillations of the tracks caused by a positional deviation of the disk, oscillations of the spindle motor (disk rotating mechanism) and synchronous and asynchronous oscillations caused by a rotary motion and oscillations of the spindle motor. Thus, an integral type digital filter is arranged within the control loop in order to reduce the relative error between the servo data and the head that is attributable to external force applied to the actuator and positional shifts of the tracks so that an operation of deviation compensation is carried out to improve the accuracy of following a track of the head.

Now, the tracks of the disk where the head is driven for a follow-up motion can give rise to eccentricity due to factors involved in the revolving motion of the disk (eccentricity of the tracks relative to the head). The factors of positional deviation include oscillations of the shaft of the spindle motor for driving the disk to rotate, those of the disk that occur when writing servo data thereon and expansions/contractions of the disk due to vicissitudes of the ambient temperature.

Known head positioning control systems normally employ a method for improving the effect of suppressing eccentricity of the tracks due to the rotary motion of the disk and hence the head positioning accuracy by raising the gain of the feedback control system. However, in an HDD, the actuator mounted with the head contains elements that can mechanically resonate to make it impossible to raise the gain of the feedback control system.

Figure 7A:
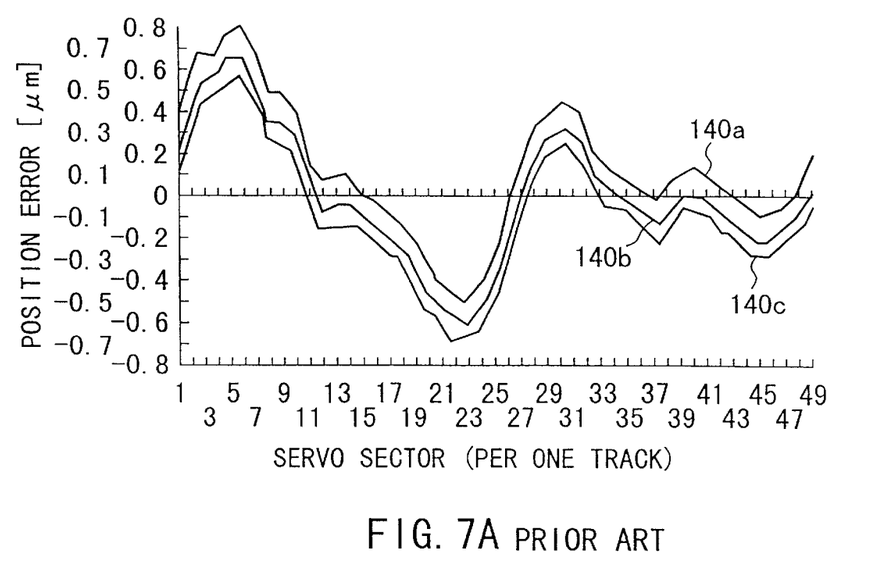
FIGS. 7A and 7B are graphs showing the spectrum of positioning accuracy (position error) obtained in the operation of positioning the head on a specific track under the control of the head positioning control system of FIG. 6.
Figure 7B:
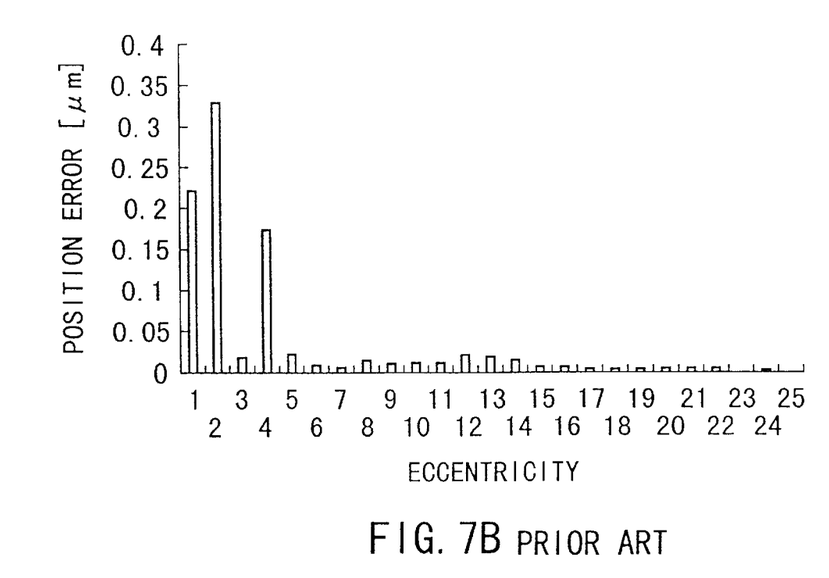

FIGS. 7A and 7B are graphs showing the spectrum of positioning accuracy (position error) obtained in the operation of positioning the head on a specific track under the control of a conventional head positioning control system. In FIG. 7A, the horizontal axis represents the positions of the servo sectors (the number of which is assumed to be 50 here) of a specific track on the disk when the disk is rotated by a single turn. In FIG. 7A, curved line 140c is obtained by plotting the averages of the observed values. The errors between the curved lines 140a and 140b are attributable to the synchronous eccentric factors that appears in the spindle motor when driving the disk to revolve.

In FIG. 7B, the horizontal axis represents the degrees of eccentric factors (degrees of eccentricity). It will be appreciated that the eccentric factors of the first, second and fourth degrees are not suppressed sufficiently and remain as repetitive periodical factors. In short, known feedback control systems cannot satisfactorily suppress the eccentric factors of the track that become apparent when the disk is driven to revolve.

Figure 4:
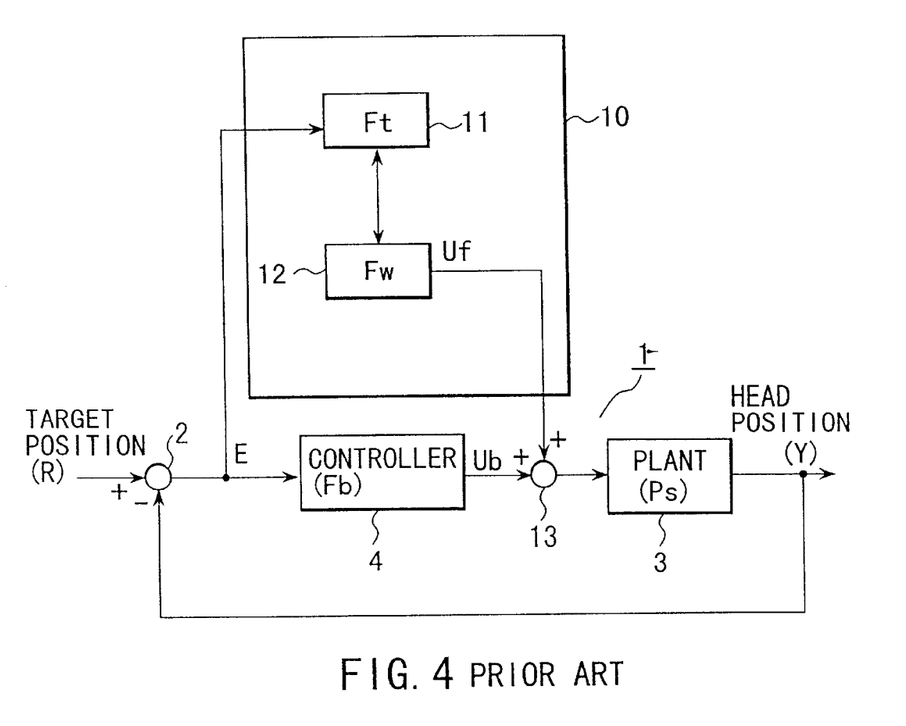
FIG. 4 is a schematic block diagram of a known head positioning control system having a learning system added thereto.

As described above, known feedback control system cannot satisfactorily suppress the eccentric factors of each track attributable to the revolution of the disk. In an attempt for solving this problem, there has been proposed a head positioning control system combining a feedback control system 1 and a feed forward control system 10, which is a learning system, as shown in FIG. 4.

The feedback control system 10 has a synchronous factor (eccentric factor) detecting section (transfer function (Ft)) 11 adapted to observe the position error (E) at the time of position control operation of the feedback control system 1 and extracts a specific eccentric factor synchronized with the period of revolution of the disk from the position error (E). Feed forward control section (transfer function (Fw) to be referred to as FW controller hereinafter) 12 computationally determines a control value (manipulative control value) Uf for suppressing the synchronous factor (eccentric factor) on the basis of the outcome of the detecting operation (learning achievement) of the synchronous factor detecting section 11 and outputs it to adder section 13 of the feedback control system 1. The adder section 13 adds the control value Ub from the controller 4 and the control value Uf from the FW controller 12 and outputs the obtained result (manipulative control value) to the plant 3.

With such as system having a synchronous factor suppressing function using a learning system, it is possible to suppress the eccentric factors of the track (synchronous factors synchronized with the revolution of the disk in particular, as will be used hereinafter) that the head can hardly follow and control solely by means of a feedback control system 1. Thus, such a system can sufficiently suppress position errors and improve the head positioning accuracy.

Figure 5A:
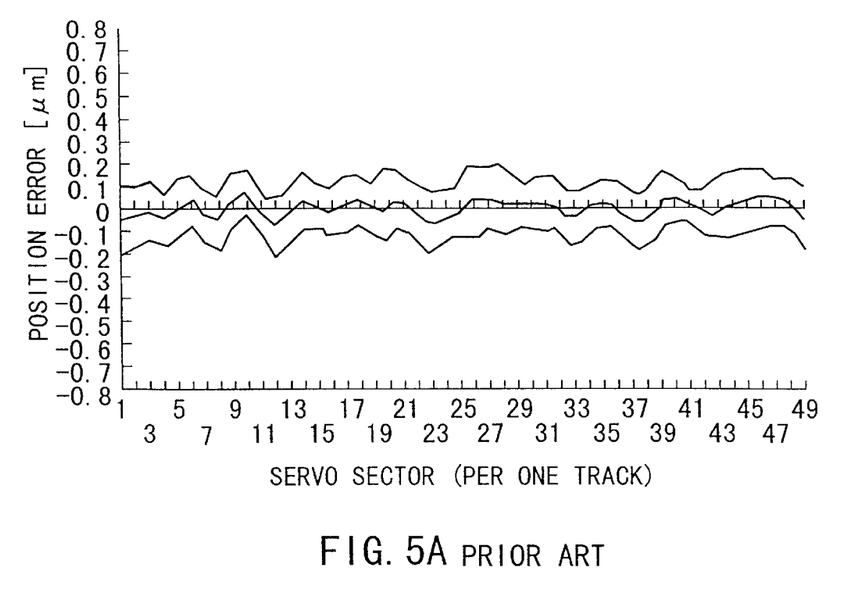
FIGS. 5A and 5B are graphs showing the spectrum of positioning accuracy (position error) obtained in the operation of positioning the head on a specific track under the control of the known head positioning control system of FIG. 4.
Figure 5B:
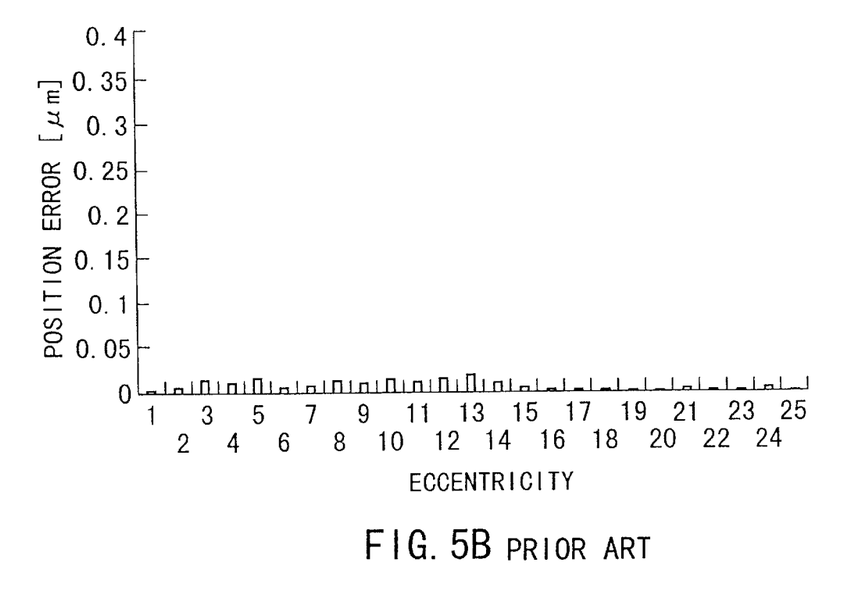

FIGS. 5A and 5B are graphs showing the spectrum of positioning accuracy (position error) obtained in the operation of positioning the head on a specific track under the control of such a head positioning control system. As clearly seen from the graphs, a head positioning control system having a feed forward control system 10, which is a learning system, can sufficiently suppress the synchronous factors if compared with a feedback control system 1 having only a feedback control system 1.

However, a head positioning control system having a synchronous factor suppressing function as described above still cannot solve the following problem. That is, the eccentric factors synchronized with the revolution of the disk include synchronous factors that are not correlated among the tracks in addition to the synchronous factors that are correlated among a plurality of tracks of the disk and produced from the environment such as impacts, oscillations and heat emission of the HDD.

More specifically, when recording servo data on the disk (normally by using a dedicated device called servo writer), there appear asynchronous factors of the spindle motor for driving the disk to revolve. Then, it is necessary to detect and suppress synchronous factors that are correlated among a plurality of tracks. However, since a system as described above can only extract the eccentric factors of a single track in a single learning session, a learning session has to be held for each of the tracks and the average of the obtained values has to be determined. Thus, a long period of time will be required to hold learning sessions in order to detect synchronous factors that are correlated among a plurality of tracks of the disk.

BRIEF SUMMARY OF THE INVENTION

It is therefore the object of the present invention to provide a head positioning control system realized by combining a feedback control system and a feed forward control system, which is a learning system, and adapted to reduce the time required for holding learning sessions necessary for detecting synchronous factors that are correlated among a plurality of tracks of the disk (eccentric factors of the tracks synchronized with the revolution of the disk) and efficiently extract and suppress the synchronous factors.

According to the invention, the above object is achieved by providing a head positioning control system realized by combining a feedback control system and a feed forward control system, which is a learning system, and having a functional feature of detecting and suppressing a synchronous factor correlated among a plurality of tracks of a disk by a single learning session of the learning system.

More specifically, according to the invention, there is provided a system for positioning a head in a target position on a disk in a disk drive, the system comprising:

means for computationally determining the position error of the position of a head of a disk drive from a target position by means of servo data recorded on a disk;

first control means for computationally determining a first control value for positioning the head at the target position on the basis of the position error;

means for generating a disturbance and adding the disturbance with a predetermined frequency different from the revolutions per unit time of the disk to the position error;

second control means for detecting a positional eccentric factor synchronized with the revolution of the disk from the position error including the disturbance and determining a second control value for removing the positional eccentric factor from the position error; and means for controlling and positioning the head at the target position, using a control value obtained by adding the first control value and the second control value.

With such a system, a synchronous factor correlated among a plurality of tracks of the disk can be extracted by a single learning session conducted while moving the head among a range containing a plurality of tracks. Thus, the time required for holding a learning session of detecting a synchronous factor correlated among a plurality of tracks can be reduced. With such a system, an operation of controlling and positioning the head can be realized reliably and efficiently by adding the second control value determined to remove the synchronous factor correlated among a plurality of tracks from the position error to the first control value computationally determined on the basis of the position error.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, the present invention will be described by referring to the accompanying drawing that illustrates a preferred embodiment of the invention.

(Configuration of HDD)

Figure 1:
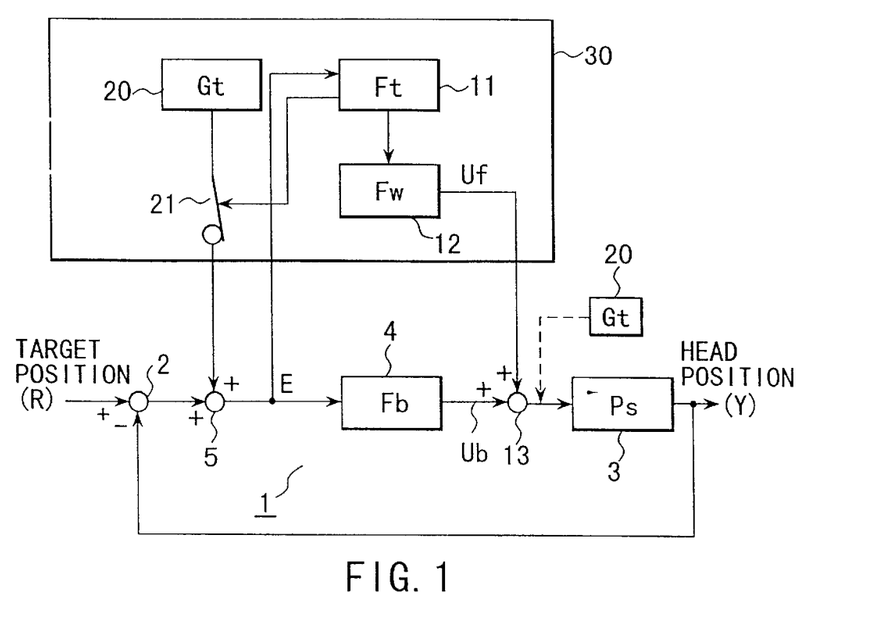
FIG. 1 is a schematic block diagram of an embodiment of head positioning control system according to the invention, illustrating the underlying concept thereof.
Figure 2:
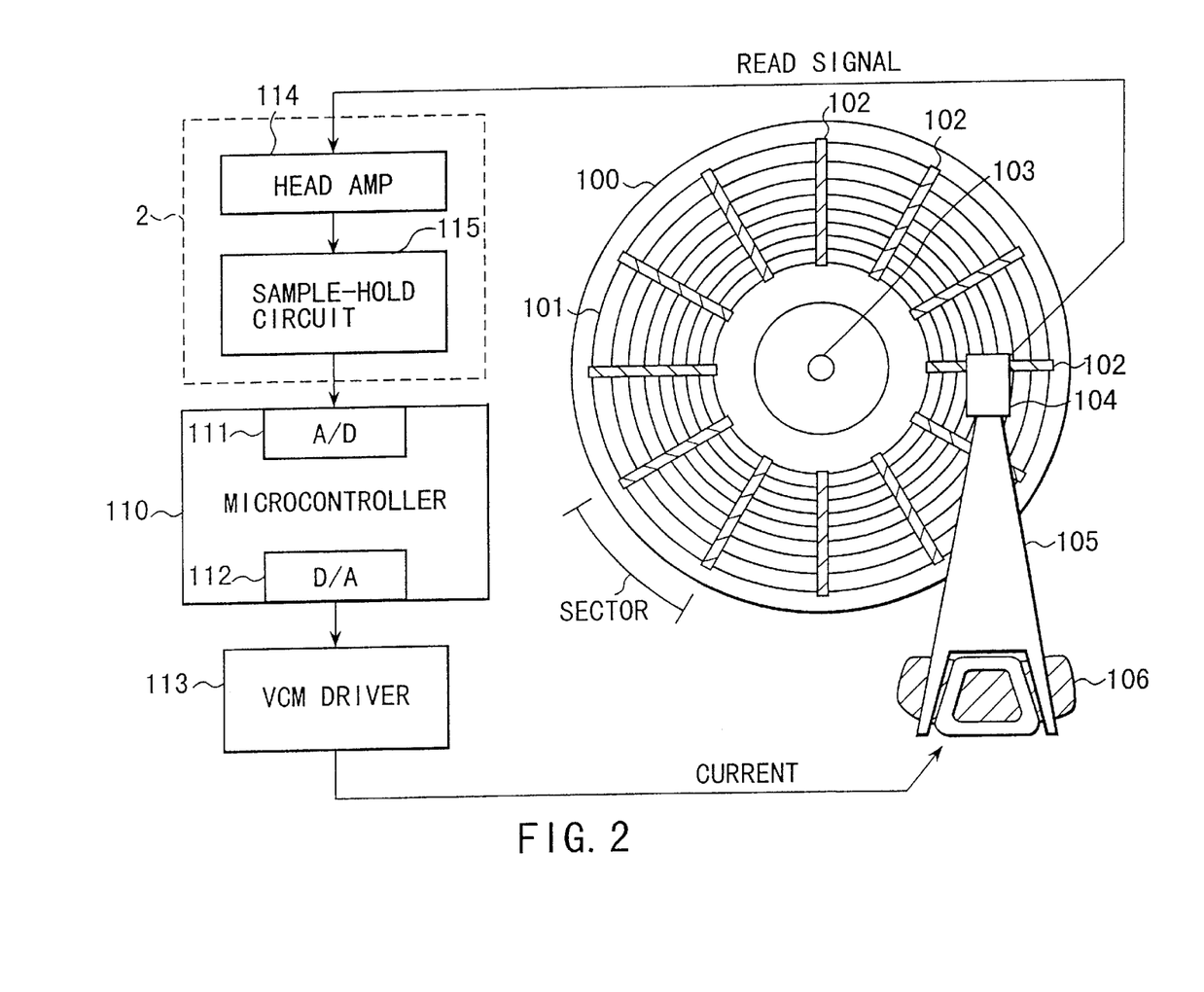
FIG. 2 is a schematic block diagram of a principal portion of a disk drive to which the system of FIG. 1 can be applied.

This invention is intended to specifically find an application in an HDD servo system as illustrated in FIG. 2. Referring to FIG. 2, the HDD servo system comprises a micro-controller 110 as principal component and is adapted to realize a head positioning control system as will be discussed hereinafter (see FIG. 1).

Firstly, in the HDD, disk 1, which is a data recording medium, is rigidly held to spindle motor 103 and driven to revolve at a predetermined angular rate. A large number of concentric tracks (cylinders) are formed on each of the opposite sides of the disk 100. Each track is divided into a plurality of servo sectors (e.g., 50 sectors). Each servo sector comprises one or more than one data sectors 101 led by a servo area 102. Data sectors 2101 are data areas for storing user data. As described earlier, the servo area 102 stores servo data including the track address (cylinder code) and servo burst data (position signal pattern) recorded at the time of manufacturing the HDD.

Head 104 is mounted on actuator 105. The actuator 105 is driven by a VCM 106 to move the head 104 in a radial direction of the disk 100 and adjust its position. The VCM 106 is driven by a drive current fed from a VCM driver 113. As described hereinafter, the actuator 105, the VCM 106 and the VCM driver 113 are included in the plant (object of control) of the head positioning control system. In a narrow sense of the word, "plant" refers to a VCM 106.

Head amplifier circuit 114 amplifies and outputs a read signal (read data) including servo data that is read out by the head 104. Sample-and-hold circuit 115 samples the amplitude values of the servo burst data (normally contain 2-phase position signals A, B and C, D) contained in the read signal and holds the sampled values, which are then output to micro-controller 110. The micro-controller 110 computationally determines the position error of the absolute position of the head from the target position (normally the center of the track to be accessed) on the basis of the amplitude values (position data of the head 104) output from the sample-and-hold circuit 115.

The micro-controller 110 comprises a CPU designed to execute control programs stored in a memory in advance as a principal component and executes the control programs of the head positioning control system, which will be described hereinafter. The expression "head positioning control" as used herein refers to seek operations for moving the head 104 to the target position and track following control operations for settling the head in the target position. In the embodiment under consideration, a system adapted to track following control operations is assumed.

The micro-controller 110 transforms the position (Y) of the head 104 into a digital value by means of A/D converter 111 and computationally determines the position error (E), which will be discussed hereinafter. Then, the micro-controller 110 computationally determines a control value (obtained by adding control value Ub and control value Uf in this embodiment) and transforms it into an analog voltage signal by means of a D/A converter 112, which voltage signal is then output to the VCM driver 113 in order to dissolve the determined position error (E). However, the system may alternatively be so configured that the D/A converter 112 is arranged on the side of the VCM driver 113 and the micro-controller 110 sets the control value that is a digital value in the VCM driver 113. The VCM driver 113 transforms the voltage signal into a drive current for driving the VCM 106 according to the control value.

(Configuration of Head Positioning Control System)

This embodiment of head positioning control system is obtained by combining a feedback control system 1 and a feed forward control system 30, which is a learning system, as shown in FIG. 1.

The feedback control system 1 drives and controls the plant (actuator) 3 according to the position error of the position of the head 104 (Y) and the target position (R) on the disk 100. On the other hand, the feed forward control system 30 is a learning system comprising a synchronous factor detecting section 11, FW controller 12 and a servo oscillator section 20.

The servo oscillator section (transfer function Gt) 20 is an element adapted to generate a disturbance signal with a predetermined frequency different from the revolutions per unit time of the disk. More specifically, the servo oscillator section 20 generates a disturbance sine wave signal with a predetermined frequency (e.g., 100 Hz) in order to oscillate the actuator 105 over a plurality of tracks.

Figure 3:
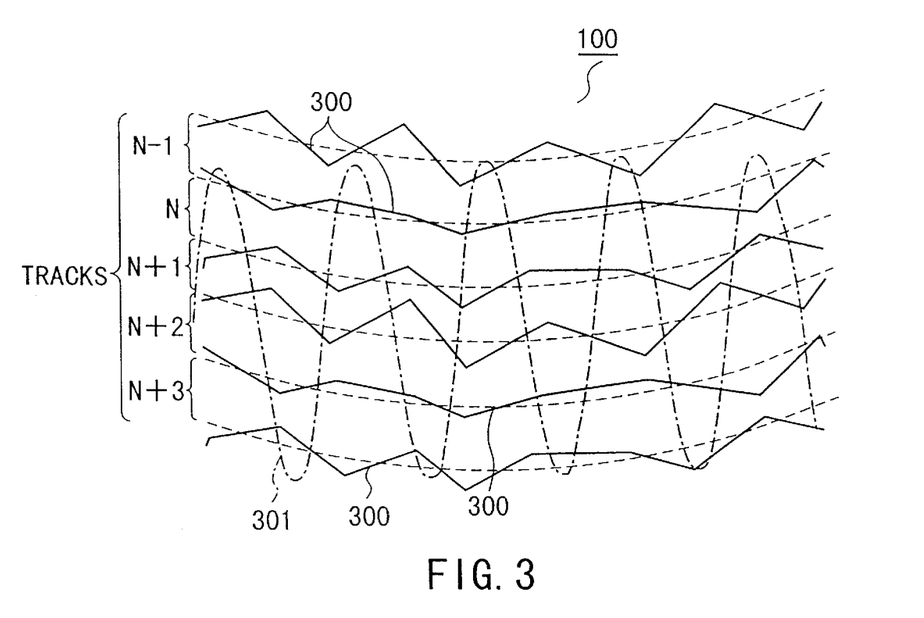
FIG. 3 is a schematic illustration of the operation of the system.

FIG. 3 is a conceptual illustration of oscillation of the head 104 caused by a disturbance signal from the servo oscillator section 20. If track N on the disk 100 is the target position, the head 104 oscillates over a plurality of tracks including the track N (locus of head 301). In FIG. 3, each solid line 300 shows the eccentricity of a track (anyone from tack N−1 to track N+1).

The feed forward control system 30 comprises a synchronous factor detecting section 11 and a FW controller 12 in addition to the servo oscillator section 20. The synchronous factor (eccentric factor) detecting section (transfer function Ft) 11 observes the position error (E) including the disturbance oscillated by the servo oscillator section 20 and detects the synchronous factor synchronized with the period of revolution of the disk contained in the position error (E) (or the eccentricity of the track), which factor is then output to the FW controller 12.

The FW controller 12 computationally determines a control value Uf for suppressing the detected synchronous factor as will be described in greater detail hereinafter and output it to the adder section 13 of the feedback control system 1. The adder section 13 adds the control value Ub from the controller 4 and the control value Uf to produce a final control value and output the latter to the plant (transfer function Ps) 3.

The feedback control system 30 additionally comprises a switch section 21 for controlling the output of the servo oscillator section 20. The switch section 21 input the disturbance (sine wave) generated by the servo oscillator section 20 to adder section 5 under the control of the synchronous factor detecting section 11. Then, the adder section 5 of the feedback control system 1 adds the disturbance from the servo oscillator section 20 and the position error from subtracter section 2 and applies the obtained sum to the controller 4 as position error (E).

Note that the feedback control system 1 has a configuration same as the above described conventional one except the adder section 5. In other words, the subtracter (position error detecting section) 2 computationally determines the position error of the actual head position (Y) from the target position (R) of the head. In this description of the embodiment, the target position (R) of the head is assumed to be the track (N) to be accessed on the disk 100 as shown in FIG. 3. Then, the controller (transfer function Fb) 4 receives the position error (E) including the disturbance as input and computationally determines the control value Ub that dissolves the position error (E).

(System Operation)

As an access command is issued from the host system, micro-controller 110 of the HDD carries out a seek operation for moving the head 104 to the track N (target position (R)) to be accessed on the disk 100. Then, the micro-controller 110 controls the actual operation of moving the actuator 105 on the basis of the track address (track number) contained in the servo data read out by the head 104. The micro-controller 110 controls the head positioning operation with a predetermined sampling period because it receives servo data at predetermined regular intervals.

Then, as the head 104 approaches the target track (N), the micro-controller 110 carries out a track following control operation of positioning the head 104 within a given range of the track (N) (normally the center of the track) and of settling the head 104. More specifically, with the embodiment of head positioning control system, the sequence of track following control operation (control process) is followed each time a set of servo burst data are read out by the head 104 from the servo area 102.

Now, the track following control operation of the micro-controller 110 will be described as system operation of the embodiment by referring to FIG. 1.

In the feedback control system 1, the subtracter section 2 computationally determines the position error of the actual head position (Y) from the target head position (R). If the switch section 21 of the feed forward control system 30 is off, the adder 5 transmits the output of the subtracter section 2 to the controller 4 as position error (E). Then, the controller 4 computationally determines the control value Ub for dissolving the position error (E) input to it and transmits it to the plant 3 as operation control value.

(Processing of Synchronous Factor)

Assume here that the position error (E) output from the subtracter 2 contains an eccentric factor of the track that is a synchronous factor produced as a result of the revolution of the disk 100. Since the switch section 21 is off, the position error (E) does not contain any disturbance output from the servo oscillator section 20.

In the feed forward control section 30, the synchronous factor detecting section 11 receives the position (E) from the feedback control system 1 and observes it. The synchronous factor detecting section 11 then carries out a processing operation of isolating a spacer eccentric factor from the position error (E) and divide it into a sine component and a cosine component.

Of the position error (E), the synchronous factor (track eccentric factor) that is synchronized with the period of revolution of the disk can be handled as periodic function and hence expanded by means of Fourier series. In other words, if the period of revolution of the disk is T and the information obtained by observing the position error (E) is E(t), equation (1) below can be obtained.

Then, the synchronous factor detecting section 11 controls the switch section 21 and input the disturbance (sine wave) generated by the servo oscillator section 20 to the adder section 5. As a result, the observed information E(t) contains the frequency factor of the oscillated disturbance:

$$E(t) = a1\sin\frac{2\pi}{T}t + a2\sin2\frac{2\pi}{T}t + a3\sin3\frac{2\pi}{T}t + \ldots + \\ b1\cos\frac{2\pi}{T}t + b2\cos2\frac{2\pi}{T}t + b3\cos3\frac{2\pi}{T}t + \ldots + \\ \frac{1}{2}c0 \quad (1)$$

where a1, a2, a3, ..., b1, b2, b3, ..., c0 represent respective Fourier coefficients (numerals 1, 2, 3 denoting the respective degrees of eccentricity), indicating the dimensions and the phase of the related respective eccentric factors. Each of the Fourier coefficients can be obtained by equations (2) below:

$$am = \frac{2}{T}\int_{-\frac{T}{2}}^{\frac{T}{2}} E(t)\sin m\frac{2\pi}{T}t\,dt \\ bm = \frac{2}{T}\int_{-\frac{T}{2}}^{\frac{T}{2}} E(t)\cos m\frac{2\pi}{T}t\,dt \\ c0 = \frac{2}{T}\int_{-\frac{T}{2}}^{\frac{T}{2}} E(t)\,dt \quad (2)$$

where (m) represents the degree of eccentricity.

Since servo data are obtained only discretely in the HDD of this embodiment, it is not possible to obtain the position error (E) as temporarily continuous information. Fourier coefficients a1, a2, a3, ..., b1, b2, b3, ... for obtaining the position error (E) as discrete information can be determined by equations (3) below:

$$am = \frac{2Ts}{T}\sum_{i=1}^{\frac{T}{Ts}} E(i)\sin m\frac{2\pi}{T}t(i) \\ bm = \frac{2Ts}{T}\sum_{i=1}^{\frac{T}{Ts}} E(i)\cos m\frac{2\pi}{T}t(i) \quad (3)$$

...equations (3)

where (Ts) represents the sampling time.

Furthermore, the equations (3) can be transformed obtain equations (4) below, which can be used to sequentially add the variation of each Fourier coefficient obtained from the currently observed information E(t) to the Fourier coefficient of the eccentric factor determined at the immediately preceding sampling:

$$am(k) = am(k-1) + \frac{2Ts}{T}E(k)\sin m\frac{2\pi}{T}t(k) \brace bm(k) = bm(k-1) + \frac{2Ts}{T}E(k)\cos m\frac{2\pi}{T}t(k)} \quad (4)$$

It is now possible, by using the relations (4), to isolate the eccentric factor correlated among the tracks from the position error information containing the disturbance (sine wave) from the servo oscillator section 20 and divide it into a sine component and a cosine component. Due to the disturbance (sine wave) from the servo oscillator section 20, the head 104 oscillates over a plurality of tracks by referring to the target track (N) as shown in FIG. 3. (Computational Processing of FW Controller)

The FW controller 12 computationally determines the control value Uf for suppressing the eccentric factor correlated among a plurality of tracks that is detected by the synchronous factor detecting section 11 as a result of the operation of the servo oscillator section 20, using equations (5) and (6) below.

If the switch section 21 of the feed forward control system 30 is off and hence the disturbance signal from the servo oscillator section 20 is made equal to 0, the position error (E) is expressed by equation (5) below:

$$E = \frac{1}{1+FbPs} + \frac{-Ps}{1+FbPs}Uf \quad (5)$$

Since the eccentric factor (e0) of the position error for "Uf=0" can be determined by means of the synchronous factor detecting section 11, the control value Uf for suppressing the specific eccentric factor (e0) can be obtained by equation (6):

$$Uf = \frac{1+FbPs}{Ps}e0 \quad (6)$$

In short, as shown in equation (6) above, the most effective control value Uf can be determined by using the transfer functions of the plant 4 and the FW controller 12 as filter.

As described above, it is possible to extract the eccentric factor correlated among a plurality of tracks that is a synchronous factor synchronized with the period of revolution of the disk and contained in the position error (E) by means of a single synchronism detecting operation (learning operation) of the feed forward control system 30, which is a learning system.

The adder section 13 of the feedback control system 1 adds the control value Ub determined by the controller 4 and the control value Uf from the FW controller 12 and outputs the sum to the plant 3 as operation control value. Thus, it is now possible to sufficiently suppress the synchronous factor correlated among a plurality of tracks that is an eccentric factor synchronized with the period of revolution of the disk to reliably control the operation of positioning the head.

It will be appreciated that the servo oscillator section 20 may alternatively be connected to the output side of the adder section 13 of the feedback control system 1 as shown in FIG. 1 instead of being connected to the feed forward control system 30.

As described above in detail, according to the present invention, it is possible to extract the eccentric factor correlated among a plurality of tracks that is a synchronous factor synchronized with the period of revolution of the disk and contained in the position error by means of a single synchronism detecting operation (learning operation) of the feed forward control system 30, which is a learning system adapted to observe the position error of the head computationally determined by the feedback control system. In short, the synchronous factor synchronized with the period of revolution for the disk and correlated among a plurality of tracks can be detected efficiently. Thus, it is now possible to efficiently suppress the synchronous factor contained in the position error of the head. As a result, the influence of the environment including impacts, oscillations and heat emissions can be handled reliably when positioning the head so that a system according to the invention can be applied to a disk drive for driving a highly densely recorded disk that requires a high head positioning accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for positioning a head in a target position on a disk in a disk drive, said system comprising:
    a determining device computationally determining the position error of the position of a head of a disk drive from a target position by means of servo data recorded on a disk;
    a first control device computationally determining a first control value for positioning said head at said target position on the basis of said position error;
    a disturbance generating device generating a disturbance and adding the disturbance with a predetermined frequency different from revolutions per unit time of said disk to said position error;
    a second control device detecting a positional eccentric factor synchronized with a revolution of said disk from said position error including said disturbance and determining a second control value for removing the positional eccentric factor from said position error; and
    a third control device controlling and positioning said head at said target position, using a control value obtained by adding said first control value and said second control value.

2. A system according to claim 1, wherein said disturbance generating device generates a disturbance of a sine wave having a predetermined frequency and oscillates said head following up said target position over a plurality of tracks.

3. A system according to claim 1, wherein said second control device includes:
    a synchronous factor detecting section observing said position error including said disturbance and detecting the positional eccentric factor synchronized with the revolution of said disk on the basis of an outcome of said observation; and
    a control section computationally determining the second control value from said position error in order to remove the positional eccentric factor.

4. A system according to claim 1, wherein said second control device computationally determines said second control value by carrying out a computational operation using a model equation of "Uf=((1+Fb×Ps)×e0)Ps", where Uf is said second control value, Ps is a transfer function of the object of control including said head, Fb is a transfer function of said first control device, and e0 is said positional eccentric factor.

5. A system according to claim 3, wherein
said synchronous factor detecting section carries out an operation of Fourier transformation on the outcome of observation of said position error and computationally determines a specific frequency component by expanding the Fourier series.

6. A system according to claim 1, further comprising:
a switch device carrying out a control operation of making a function of said disturbance generating device effective or ineffective.

7. The system according to claim 1, wherein said disturbance generating device operates when factors that are correlated among tracks of said disk are derived.

8. The system according to claim 2, wherein the sine wave has a frequency factor different from a revolution per unit time of said disk.

9. A disk drive comprising:
a disk having servo areas storing servo data to be used for controlling an operation of positioning a head and data areas storing user data;
a head for reading said servo data and reading data from and writing data in said data area;
an actuator operating as head drive mechanism for positioning said head at a target position on said disk;
a first control system having a determining device computationally determining a position error of a position of said head relative to said target position and a first control device computationally determining a first control value for driving and controlling said actuator on the basis of said position error; and
a second control system having a disturbance generating device adding a disturbance with a predetermined frequency to said position error, a second control device detecting a positional eccentric factor synchronized with a revolution of said disk from said position error containing said disturbance and a third control device computationally determining a second control value for removing the positional eccentric factor from said position error and adding it to said first control value.

10. A disk drive according to claim 9, wherein said disturbance generating device included in said second control system generates a disturbance of a sine wave with a predetermined frequency and oscillates said head following up said target position over a plurality of tracks.

11. A disk drive according to claim 10, wherein said disturbance generating device generates a disturbance of a sine wave having a predetermined frequency and oscillates said head following up said target position over a plurality of tracks.

12. A disk drive according to claim 9, further comprising:
a switch device carrying out a control operation of making a function of said disturbance generating device effective or ineffective.

13. The disk drive according to claim 9, wherein said second control system adds the disturbance to the position error when factors that are correlated among tracks of said disk are derived.

14. The disk drive according to claim 10, wherein the sine wave has a frequency factor different from a revolution per unit time of said disk.

* * * * *